US005353346A

United States Patent [19]

Cox et al.

[11] Patent Number: 5,353,346

[45] Date of Patent: Oct. 4, 1994

[54] MULTI-FREQUENCY SIGNAL DETECTOR AND CLASSIFIER

[75] Inventors: Neil B. Cox; Edwin L. Froese, both of Burnaby, Canada

[73] Assignee: MPR Teltech, Limited, Burnaby, Canada

[21] Appl. No.: 994,910

[22] Filed: Dec. 22, 1992

[51] Int. Cl.$^5$ .............................................. H04M 1/00
[52] U.S. Cl. .................................. 379/386; 379/283; 370/110.3; 364/724.09
[58] Field of Search .............................. 379/386, 283; 370/110.3; 328/137; 364/724.09, 724.1, 724.07

[56] References Cited

U.S. PATENT DOCUMENTS

| | | | |
|---|---|---|---|
| 4,386,239 | 5/1983 | Chien | 379/386 |
| 4,521,647 | 6/1985 | Olson et al. | 379/386 X |
| 4,679,001 | 7/1987 | West | 364/724.07 X |
| 4,782,523 | 11/1988 | Garland et al. | 379/386 |
| 5,138,569 | 8/1992 | Valenzuela | 364/724.09 |
| 5,163,050 | 11/1992 | Cromack | 370/110.3 |

Primary Examiner—James L. Dwyer
Assistant Examiner—Paul A. Fournier
Attorney, Agent, or Firm—Thomas P. Liniak

[57] ABSTRACT

A method and apparatus for detecting and classifying signals that are the additive combination of a few constant-amplitude sinusoidal components, herein called N-tones. The attributes of this method and apparatus include provision of superior classification performance with an algorithm of low computational complexity. The method includes filtering to remove extraneous signal components, separation of the incoming signal into one or more output streams and segmenting these output streams into blocks of successive data samples. The magnitude of the data within each block is estimated along with the frequencies of the dominant spectral components. The frequency estimates are then used as part of the configuration process of a set of notch filters for removal of the identified dominant spectral components. The newly-configured notch filters are then applied to the same data blocks and the magnitudes of their outputs are estimated. The estimated magnitudes from before and after the notch filtering are then passed on to a block classifier along with the aforementioned frequency estimates. This block classifier tests its inputs to ascertain if the input signal conforms to pre-specified conditions of tonal purity, absolute component magnitude, relative component magnitude and component frequency. Finally, a timing classifier is applied to monitor the time course of block classifications and test the candidate N-tones for conformance with application-specific requirements regarding signal persistence and longevity.

34 Claims, 2 Drawing Sheets

MULTI-FREQUENCY SIGNAL DETECTOR AND CLASSIFIER

BACKGROUND

The present invention relates to a detector and classifier for signals that are the additive combination of a few constant-amplitude sinusoidal components, hereafter called N-tones. The invention herein has particular application to the sub-class of N-tones called dual-tone multi-frequency (DTMF) telephone signals.

DTMF signals are N-tones used for representing telephone numbers and other signalling functions within the telephone system. Detailed specification of DTMF signal properties have been standardized by international agreement. Sixteen unique DTMF signals are defined; one for each of the numbers on a telephone keypad plus six for additional keys. Ignoring noise, distortion and allowable equipment variability, each DTMF signal is an additive combination of two equal-amplitude tones. The frequencies of the component tones serve to distinguish one DTMF signal from another. Specifically, each DTMF signal is comprised of two tones with frequencies taken from two mutually-exclusive frequency bands. For example, the signal generated by depressing "1" on the telephone keypad is the sum of a 697 Hz tone and a 1209 Hz tone, and the signal generated by depressing "5" is the sum of a 770 Hz tone and a 1336 Hz tone. The low frequency band, or low-band, is comprised of tones with frequencies of (nominally) 697 Hz, 770 Hz, 852 Hz and 941 Hz. The high frequency band, or high-band, is comprised of tones with frequencies of (nominally) 1209 Hz, 1336 Hz, 1477 Hz and 1633 Hz.

In telephony applications, one must be able to quickly detect and accurately classify DTMF signals that are embedded in noise, and one must not falsely indicate DTMF presence within other valid signals. The second issue generally presents the largest challenge because short segments of speech occasionally appear very DTMF-like.

The common approaches to DTMF detection are band-pass filtering, parametric modelling and zero-crossing analysis. The filter-based detectors use band-pass filters to isolate the strongest spectral components in the signal, and then either directly or indirectly test the frequency, purity and relative magnitude of the components. Detectors that use the discrete Fourier transform (DFT) fall under this category because the DFT can be viewed as a bank of narrow band-pass filters each followed by a magnitude estimator. The most common modelling method is linear prediction, an advantage of which is computational efficiency. Splitting of the input signal into two monotonal streams reduces the complexity and allows for the use of lower-order predictors. The principle advantage of the zero-crossing approach is its ease of implementation using simple integrated hardware.

SUMMARY OF THE INVENTION

It is an object of the present invention to provide an improved method of detecting and classifying signals like the DTMF signals that are the additive combination of a few constant-amplitude sinusoidal components, herein called N-tones. The invention includes filtering to isolate the component tones, estimation of the frequency of each component tone, application of periodically-reconfigured notch filtering to remove each component tone, and comparison of signal properties from before and after the notch filters to ascertain conformance with predefined properties of the N-tones being detected.

A major contribution of this invention is that it provides superior classification performance with an algorithm of low computational complexity. For example, as indicated in an article by Gay, S.L., Hartung, J., and Smith, G.L. entitled "Algorithms for Multi-Channel DTMF Detection for the WE-DSP32 Family", published in the Proceedings of the 1989 IEEE International Conference on Acoustics, Speech and Signal Processing, at pages 1134 to 1137, current standards of performance in DTMF detectors regard five false detections in a 30 minute sampling of speech as a good level of performance. The present invention produced no false detections in over 220 minutes of test material, including samples of telephone traffic, a radio talk show, music and the same 30 minute speech sampling as was used in establishing the aforementioned standard of performance. This was achieved with an algorithm that consumes a small fraction of the computing capacity of present-day digital signal processors.

BRIEF DESCRIPTION OF THE DRAWINGS

The novel features believed characteristic of the invention are set forth in the appended claims. The invention itself, however, as well as other features and advantages thereof, will be best understood by reference to the description which follows, read in conjunction with the accompanying drawings wherein:

DETAILED DESCRIPTION WITH REFERENCE TO THE DRAWINGS

Figure 1:
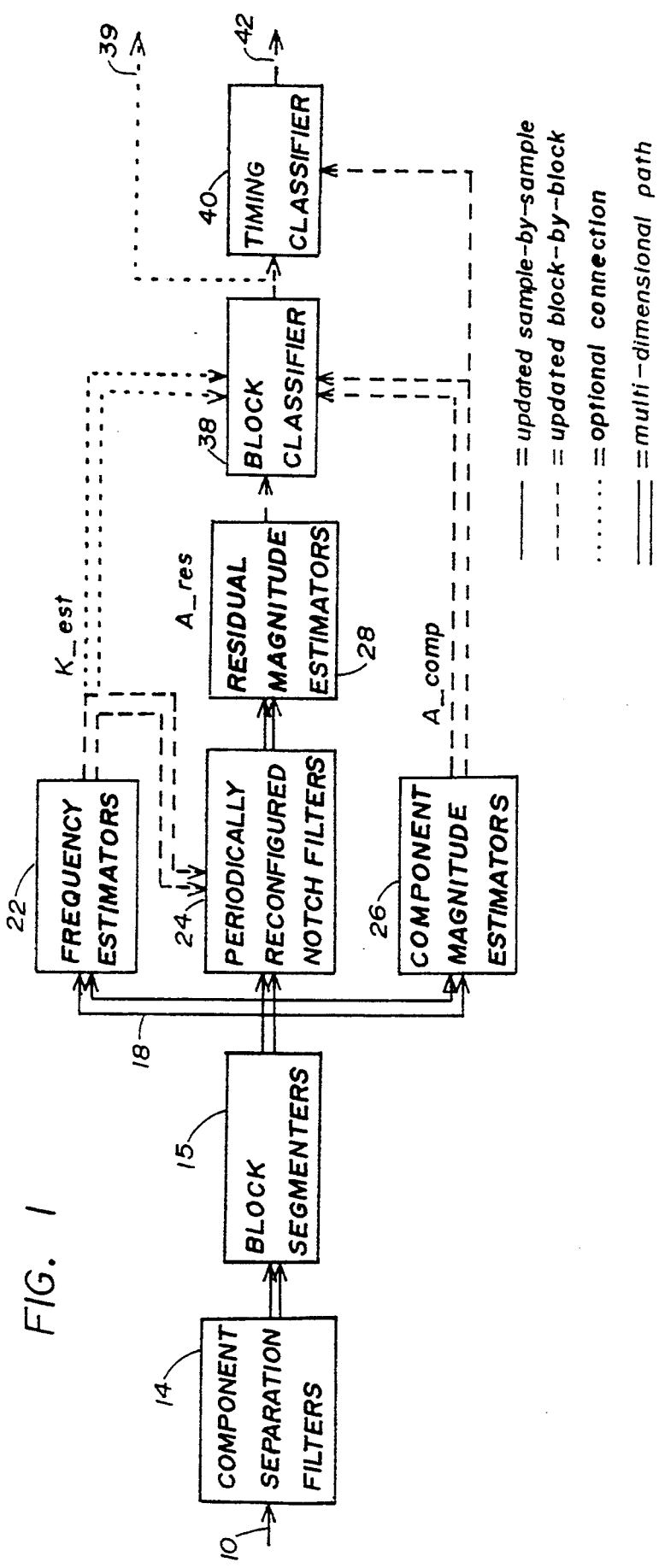
FIG. 1 is a general schematic diagram of a preferred embodiment of the invention.

Referring to FIG. 1 there is shown a block diagram of a representative embodiment of the invention for processing a stream of input data on input line 10. The input data is in digital form, being samples of an analog signal taken at a frequency of at least two times the frequency of the highest frequency tonal component present. The component isolation filters 14 serve to remove extraneous signal components and to separate the input stream of data into parallel output streams 18. It is sensible though not imperative that the component isolation filtering be performed such that the following conditions are satisfied:

(a) Each of the output streams contains a subset of the tonal components of a valid N-tone.

(b) None of the tonal components of a valid N-tone appear on more than one output stream.

(c) None of the tonal components of a valid N-tone fail to appear on any of the output streams.

For example, in a DTMF application there could be two output streams with one stream containing components from the high frequency band and the other stream containing components from the low frequency band. Alternatively, a single output stream could be produced which contains both tonal components of the DTMF; the filtering then simply serves to remove large extraneous components such as dial-tone. The component isolation filtering should be achieved without using highly-tuned filters so that the contrast between tonal signals and other signals is preserved.

The output streams from the component isolation filters 14 are directed to the block segmenters 15 to obtain parallel blocks of successive data samples. It is sensible, though not imperative, that all blocks contain the same number of samples and that the segmentation boundaries for each stream be aligned in time. Subsequent processing is then performed on time-aligned sets of blocks that contain one block from each stream. Each such set of blocks will hereafter called a block-set. It is assumed in the sequel that the block segmenters 15 are configured for generating block-sets as described above.

The block-sets are directed over the output streams 18 to the frequency estimators 22, the periodically-reconfigured notch filters 24 and the component magnitude estimators 26. The outputs of the notch filters 24 are directed to residual magnitude estimators 28. The purpose of these elements is to derive data required for determining if input line 10 has the requisite properties of an N-tone.

The average magnitude for each block within a block-set is estimated by the corresponding component magnitude estimator 26, thereby producing one L-dimensional vector of component magnitude estimates A_comp, where L is the number of parallel streams within inputs 18. These average magnitude estimates can be computed by simply summing the square of the sample values in each block.

The frequency estimators 22 are used to identify the frequencies of the dominant spectral tones so that the notch filters may be initialized to filter out these tones. Specifically, the frequency estimators 22 act on the block-set to estimate the N-dimensional vector of frequency-determining filter coefficients K_est, where N is the number of tonal components in the N-tone. This frequency estimation can be performed using one of a number of methods for estimating the frequency of sinusoids embedded in noise that have been described in the literature. A method based on linear prediction is a suitable choice.

The derived frequency-determining filter coefficients are used to periodically reconfigure the notch filters 24. Constrained notch filters with the following system function were used:

$$H(z) = \prod_{j=1}^{J} \frac{1 - K\_est_j z^{-1} + z^{-2}}{1 - \beta K\_est_j z^{-1} + \beta^2 z^{-2}}$$

where J is the number of tones that are expected to be on the stream and $\beta$ is the distance of the filter's poles from the origin in the z-domain. The sum of the J for each stream equals N, the total number of tonal components. The reconfiguration entails zeroing of the filters' output histories and the setting of all $K\_est_j$ just before applying the filters to a block set. This deadens any ringing that is precipitated in the preceding block-set. The input histories of the filters are not altered as part of the reconfiguration.

The newly-configured notch filters 24 are applied to the block-set so as to remove the tonal components that were identified by the frequency estimators 22. The resultant signals are directed to the residual magnitude estimators 28 which produce one L-dimensional vector of residual magnitude estimates A_res. The method used for residual magnitude estimation is the same as was used for component magnitude estimation.

Insight into the performance of this DTMF detector can be gained by reflecting on the transient response properties of constrained notch filters. The transient response for such a filter is characterized by a large amount of ringing on the sudden onset or disappearance of a tone that is supposed to be removed, particularly when $\beta \approx 1$. By superposition it follows that such ringing will occur whenever there is a change in the amplitude of such a tone. The implication of this ringing phenomenon combined with the periodic filter reconfiguration is that the output magnitude of a constrained notch filter remains low relative to its input only if the input is dominated by a constant-amplitude tone that spans the entire length of the block of data under analysis. Such a restriction is seldom met by non-stationary signals such as speech.

The requirements for the component isolation filters 14, the frequency estimators 22 and the notch filters 24 are interdependent. It was stated earlier that the component isolation filters produce one or more isolated streams which, in the presence of an N-tone, each contain one or more (i.e. J) tonal components. The simplest filtering option is to produce only one output stream. However, no information is then provided to the block classifier about the relative strength of each tonal component unless further component separation is performed during application of the notch filters 24. One may consider using a cascade of lower-order notch filters for multi-component streams in order to obtain additional information about individual signal components, but special measures are then needed to ensure that transient effects of the periodic filter reconfiguration do not significantly affect later filters in the cascade. One method of minimizing these effects is to delay the periodic reconfiguration for later filtering stages until the transients have largely disappeared. However, this leads to an increase in the variance of the residual magnitude estimates 28 because fewer data points are available for analysis. Finally, while a number of well-known techniques can be used for estimating component frequencies when the number of components is known, these techniques are simpler and more efficient when the number of components is small.

The block classifier 38 and the timing classifier 40 are applied to test if a valid N-tone is present on input line 10. The block classifier 38 performs tests on the three vectors A_comp, K_est and A_res to determine if the current block-set has the required properties of an N-tone. Straight-forward comparisons among these vectors allow for testing of the frequency, purity, absolute magnitude and relative magnitude of the component tones. The timing classifier 40 is applied to the output of the block classifier 38 to impose signal duration conditions as appropriate to the application. A subset of the component magnitude estimates from estimators 26 is provided as input to the timing classifier 40 to obtain better resolution in estimating the signal duration. An example of such a refined signal duration estimate is presented later in the discussion of FIG. 2.

The outputs of both classifiers 38 and 42 are ordinals that are updated once per block-set. There are normally M+2 ordinal values, where M is the number of valid N-tones. The extra two ordinals are used to indicate that no N-tone is present or that there has not been sufficient data to make an accurate classification.

An alternative to applying frequency tests within the block classifier 38 is to impose bounds on the elements of the K_est vector prior to their use in configuration of the notch filters 24. The resulting maladjustment of the notch filters for out-of-bounds tones leads to violation of the tonal purity tests within the block classifier, thus making it unnecessary to explicitly test K_est within the block classifier.

The choice of block-size for the above analysis is influenced by conflicting requirements. A large block-size reduces the total computational load, reduces the variance of estimated parameters and reduces the sensitivity to noise. A long block-size also takes better advantage of non-stationarity in signals such as speech, thereby reducing the likelihood of misclassification. On the other hand, short block-sizes reduce the delay in detecting an N-tone and facilitate detection of short-duration N-tones.

An Embodiment for DTMF Detection and Classification

Figure 2:
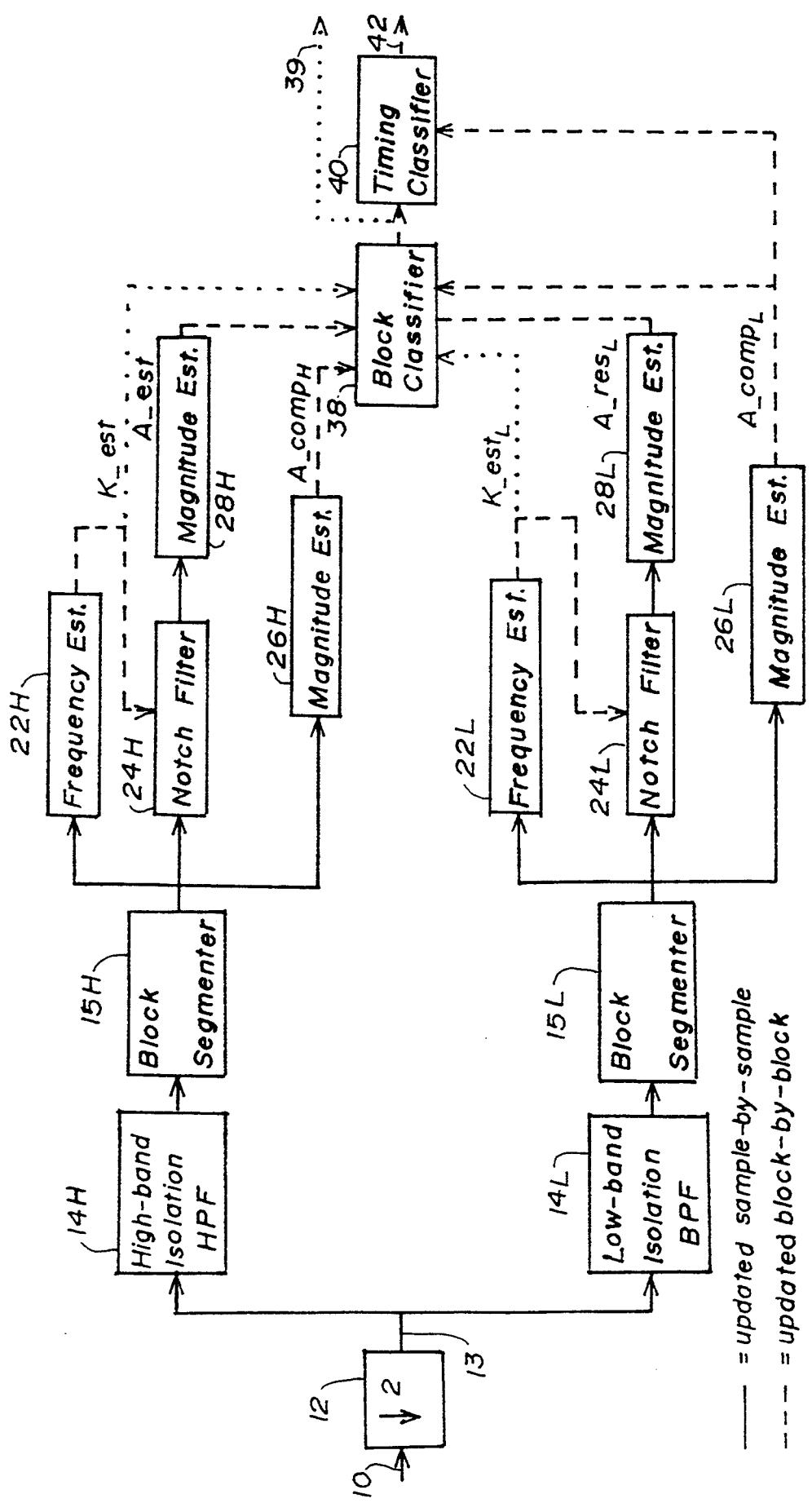
FIG. 2 is a schematic diagram of an embodiment of the invention configured for detection of DTMF telephony signals.

Referring to FIG. 2 there is shown a block diagram of an embodiment of the invention configured for detection and classification of DTMF telephony signals. Like reference numbers as in FIG. 1 are used to refer to like parts. The entire assembly was implemented on a 27 MHz DSP56001 digital signal processor. The block diagram includes a two-to-one downsampler 12 and an input 10 to which is connected a stream of sampled data that is sampled at 8000 Hz. This downsampling involves simply ignoring every other sample. Downsampling is performed to reduce the processing requirements and to reduce the required sharpness of the subsequent band-isolation filters.

The downsampled data on line 13 is directed to the high-band isolation filter 14 and the low-band isolation filter 14L. The high-band isolation filter 14H isolates the high-band DTMF tones (>1200 Hz) from the low-band DTMF tones (<1000 Hz). A 5th-order elliptic infinite impulse response (IIR) high-pass filter designed for a sampling frequency of 4000 Hz, band-edge frequency of 1160 Hz, 0.25 dB pass-band ripple and 40 dB stop-band attenuation is used. The low-band isolation filter 16 isolates the low-band DTMF tones from dial tone (<500 Hz) and high-band DTMF tones. An 8th-order elliptic IIR band-pass filter designed for a sampling frequency of 4000 Hz, band edges of 630 Hz and 1010 Hz, 0.25 dB pass-band ripple and 40 dB stop-band attenuation is used.

The output streams from the filtering stage are each passed through a block segmenter 15 and processed to derive the data required in the block classifier 38. When valid DTMF is provided as input, the signals on the two output streams 18H and 18L are mono-tonal. Correspondingly, the analyses performed by the frequency estimators 22, the notch filters 24, the component magnitude estimators 26, and the residual magnitude estimators 28 are essentially designed to provide measures of the monotonicity of streams 18. The sequence of performing these analyses is the same as that discussed with respect to FIG. 1. Details on the analysis methods for the DTMF embodiment of FIG. 2 are presented below. Suitable block-sizes for these analyses for DTMF detection are in the range of 6 ms to 18 ms.

The frequency estimators 22H and 22L each use an autocorrelation-based analysis to derive an estimate of the frequency-determining coefficients. This can also be viewed as a form of linear prediction analysis. The method relies on the fact that the autocorrelation function of a sinusoid is a scaled version of the same sinusoid, except noise components are reduced and phase information is discarded. Given this fact and the relation $\cos(\phi\text{-}e)+\cos(\phi\Theta)=2\cos(\Theta)\cos(\Theta)$ it can be shown that if the signal is approximately mono-tonal then its frequency can be estimated from the following formula:

$$K\_est_j = 2\cos(2\pi f\_est_j T) = (r[k-1]+r[k+1])/r[k]$$

where $K\_est_j$ is the estimated frequency-determining coefficient for component j, $f\_est_j$ is the frequency identified by $K\_est_j$, T is the sampling period and r[k] is the autocorrelation function at offset k. The autocorrelation values are estimated using the following formula:

$$r[k] = \sum_{i=0}^{BS-1} x[i]\,x[i-k]$$

where x[] is a block of successive data samples and BS is the number of samples in the block. For the present embodiment it is not necessary to explicitly derive the component frequencies, rather, it is sufficient to proceed only as far as is required to estimate $K\_est_j$. It is also only necessary to produce estimates of $K\_est_j$ once every BS samples.

The aforementioned formula for $K\_est_j$ is sometimes applied twice within each frequency estimator with different values of K in order to minimize both the variance and the bias of the derived estimate. Estimation variance increases as the denominator of the expression (r[k]) decreases. From known properties of the autocorrelation function this suggests that the best choice of k is zero. Unfortunately, the result when k=0 can be biased when noise is present because of the positive contribution that noise makes to r[0]. The solution is to initially apply the $K\_est_j$ estimator with a compromise value of k that is relatively effective for all possible tones, and then re-apply the estimator with a new value of k if a better one exists for the tone that is present. For the DTMF detector illustrated in FIG. 2, initial compromise values of k=5, and k=2 are suitable for data streams 18H and 18L, respectively. Based on the initial estimates of $K\_est_L$, one then chooses offsets of 3, 5, 5 and 2 when the tone is near the nominal low-band DTMF frequencies of 697 Hz, 770 Hz, 852 Hz and 941 Hz respectively. Similarly, for $K\_est_H$ one should use offsets of 5, 3, 4 and 5 for the second pass in the presence of 1209 Hz, 1336 Hz, 1477 Hz or 1633 Hz tones, respectively.

The notch filters 24H and 24L are each periodically-reconfigured second-order constrained notch filters. The associated system function and the details for periodic reconfiguration were presented in the discussion of FIG. 1. Choosing $\beta=0.87$ provided a convenient tradeoff between speech signal rejection and tolerance of additive noise. Different choices of $\beta$ may be more appropriate for other applications and noise environments.

The component magnitude estimators 26H and 26L, and the residual magnitude estimators 28H and 28L, each use the following estimate of signal magnitude:

$$A = \sum_{i=0}^{BS-1} x^2[i]$$

where x is a block of data taken from either the input or the output of one of the notch filters. Normalization with respect to BS is incorporated later within configuration constants for the block classifier 38 so as to avoid unnecessary computations. As with the frequency estimators 22H and 22L, the magnitude estimates are produced only once every BS samples.

The block classifier 38 tests the frequency, the purity, the absolute magnitude and the relative magnitudes of the component tones. These tests are implemented on a block-by-block basis through straightforward comparisons among the associated frequency and magnitude estimates. Specifically, the frequency is checked by imposing bounds on $K\_est_L$ and $K\_est_H$, the purity is checked by testing that both $A\_res_H << A\_comp_H$ and $A\_res_L << A\_comp_L$, the absolute magnitude is checked by testing that both $A\_comp_H$ and $A\_comp_L$ exceed a fixed configuration constant, and the relative magnitude or twist is tested by comparing $A\_comp_H$ with $A\_comp_L$.

The timing classifier 40 is needed to impose the signal duration requirements specified in CCITT Recommendation Q.24, where it is specified that: 1) DTMF-like segments of less than 25 ms shall be rejected, 2) DTMF-like segments of greater than 40 ms shall be accepted, 3) non-DTMF segments of less than 20 ms within a DTMF segment shall be ignored, and 4) non-DTMF segments of greater than 30 ms shall be recognized. The present implementation uses two timing thresholds to impose these restrictions: one for acceptance or rejection of DTMF-like segments, and one for acceptance or rejection of a non-DTMF segment. The recommended thresholds are 36 ms and 26 ms, respectively.

The timing classifier 40 is driven by the time course of block classifications 39 and by the low-band component magnitude estimate $A\_comp_L$. The timing classifier 40 is considered to be in a stable state whenever each block classification 39 agrees with the most recently asserted output class 42. The first block classification that contradicts the asserted output class throws the program into a controlled race condition, where the estimated duration of DTMF and non-DTMF are simultaneously accumulated. The race winner is the first duration to reach its timing threshold. If the race is won by the same class as was previously asserted, then one returns to the stable state without altering output class 42. Otherwise, the indicated class change is conveyed to the output class 42 prior to returning to the stable state.

Certain properties of the block classifier's output result in the need for refined estimates of signal duration within the timing classifier 38. Except for some relatively minor exceptions, a DTMF signal is not detected by the block classifier 40 unless it completely fills the block-set under analysis. If simple block counts are used as duration estimates, then the results depend on the coincidental alignment between the block demarcation boundaries and on/off transitions in the DTMF signal. For example, if the DTMF signal is 30 ms and the analysis block-size is 15 ms, then the analysis may separate the DTMF signal into two completely-filled blocks or it may separate the DTMF signal into one full block surrounded by two partially-filled blocks. In this example which ignores other factors, two blocks are classified as DTMF-like in the first case, whereas only one is classified as DTMF-like in the second case. When all factors are taken into account, a block-size of less than 8 ms is needed in order to distinguish between a 25 ms invalid DTMF-like signal and a 40 ms valid DTMF signal using a simple block count. Similarly, the block-size must be less than 4 ms before one can use a simple block count to distinguish between a 20 ms switch bounce and a 30 ms inter-digit pause.

Refined duration estimates are obtained by assuming that the noise level is relatively low when a DTMF signal really is present (say SNR>12dB) and that the immediate neighbors of a series of DTMF-like blocks contain transitions from silence to DTMF or transitions from DTMF to silence. Under these assumptions it follows that a running estimate of the duration of a DTMF-like segment is given by the following:

$$dur = BSe(A_{c+i}/A_c + C + A_0/A_1)$$

when the same DTMF digit has been detected in each of the preceding C block classifications but the most recently derived block classification was not a DTMF-like, and $$dur = BS(Ac+I/Ac+C+1)$$

when the same DTMF digit has been detected in each of the preceding C block classifications and the most recently derived block classification was also the same DTMF digit, and dur=0 when neither of the above conditions apply, where $A_i$ is a component magnitude estimate from the i block sets preceding the most recently acquired block-set. The duration of non-DTMF is simply an accumulation of the time that is not counted as DTMF-like during estimation of "dur".

The following additional conditions were included in the timing classifier 40 for proper performance. Firstly, a one block delay is built into the non-DTMF duration counter so that transitions from non-DTMF to DTMF are properly handled, that is, when the current block is classified as non-DTMF, one needs to know whether the next block is DTMF-like or non--DTMF before it is possible to determine how much of the current block is non-DTMF. Secondly, interruption of a string of non-DTMF blocks by a DTMF-like block causes reset of the non--DTMF duration counter. This ensures that short gaps caused by the repeated bounce of a switch do not accumulate and erroneously appear to be a valid inter-digit pause. Finally, a change from one DTMF class to another during a race must cause reset of the DTMF duration counter. The new DTMF class will then be asserted only after it alone is present for a sufficient amount of time.

Performance of the Embodiment for DTMF Classification

The performance of the block classifier 38 for DTMF signal detection is optimistically described by two assertions. The first assertion is the output class 39 is asserted to be DTMF-like only when the block is full of DTMF signal. Tests have shown this always to be true at the start of a DTMF signal. However, a block which straddles a DTMF signal's endpoint may be classified as DTMF-like if the block's endpoint is less than about 3 ms beyond the DTMF signal's endpoint. The second optimistic assertion is that the block classifier's output 39 is always asserted to be DTMF-like when the block is filled with a DTMF signal. Tests have shown that this may be false if the leading edge of the block is within about 4 ms of the onset of the DTMF digit. This is due to the aggregate transient response of the channel and the input filters, which "smears" the startup transition across a number of samples, thereby producing ringing in the constrained notch filters.

The performance of an embodiment of FIG. 2 for DTMF signal detection and classification was tested using a DTMF receiver test tape produced by Mitel Corporation and sold as product number CM7291. The Mitel test tape provides easily-performed conformance tests for DTMF detectors, including calibration signals, six tests of detection performance, and 30 minutes of excerpts from telephone conversations. More than 180 minutes of additional non-DTMF material was also used, including 90 minutes of recorded broadcast radio program consisting of a telephone call-in talk show, music, sports, news, traffic reports, and advertisements, and 90 minutes of music consisting of the Supertramp albums entitled "Even in the Quietest Moments" and "Crime of the Century". The embodiment of FIG. 2 was easily configured for conformance with CCITT requirements regarding tolerance to frequency detuning, amplitude twist, pulse duration and inter-pulse separation. All noisy DTMF tone--pairs on the Mitel tape were correctly detected and classified. Two successive false-positive assertions of the block-classifier's output 39 occurred on the Mitel test tape during a strange non-voice "chirp" sound. Another isolated block-class false-positive occurred during the music test. These false positives were removed by the subsequent timing classifier 40, hence, no false positive indications resulted at the timing classifier's output 42.

The block-size used during the above evaluations was 9 ms. This was chosen for application-specific reasons that are unrelated to the invention, and is not the optimum setting for DTMF signal detection. One would expect even better performance for longer block-sizes.

An attractive feature of the system is its light computational requirement. For example, the proposed configuration for DTMF detection consumed a small fraction of the capacity of the Motorola DSP56001 digital signal processor on which it was implemented.

While this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modifications of embodiments as fall within the true scope of the invention.

We claim:

1. Apparatus for detecting and classifying signals on a source line that are the additive combination of a few constant-amplitude sinusoidal components, herein called N-tones, comprising:
   (a) means for rejecting extraneous signal components from said source line signals, the output of which is one or more separate output streams;
   (b) means for producing blocks of successive data samples from each of said output streams;
   (c) means for estimating the magnitude of data within each said block from each of said output streams;
   (d) means for identifying the dominant spectral components within each of said blocks of each of said output streams;
   (e) means for removing the identified dominant spectral components from each of said blocks from each of said output streams without regard to previous blocks;
   (f) means for estimating the magnitude of data within each said block from each of said output streams after the identified dominant spectral components have been removed;
   (g) means for comparing the magnitude estimates that were obtained both before and after removal of the identified dominant spectral components as a test for partially determining if the corresponding signal on said source line has the requisite properties of an N-tone;
   (h) means for testing the frequencies of the identified dominant spectral components to partially ascertain if the corresponding signal on said source line has the requisite properties of an N-tone;
   (i) means for deriving a running estimate of the duration of time that the signal on said source line is an N-tone;
   (j) means for deriving a running estimate of the duration of time that the signal on said source line is not an N-tone;
   (k) means for testing the durations of candidate N-tones and intervening non-N-tone segments for conformance with signal persistence and longevity requirements.

2. Apparatus according to claim 1, wherein said rejecting means includes a digital filter for each of said output streams.

3. Apparatus according to claim 2, wherein said rejecting means include a means of sample-rate conversion.

4. Apparatus according to claim 1, wherein said means for identifying the dominant spectral components employs linear prediction analysis to produce as output the set of frequency-determining filter coefficients defined by $$K\_est_j = 2\cos(2\pi f\_est_j T)$$

where $K\_est_j$ is the estimated frequency-determining filter coefficient for component j, $f\_est_j$ is the frequency identified by $K\_est_j$ and T is the sampling period for signals on each of said output streams.

5. Apparatus according to claim 1, wherein said identified dominant spectral components are bounded to be near prespecified nominal values thereby impeding the subsequent removal of said dominant spectral components unless said dominant spectral components are each near one of the prespecified nominal values.

6. Apparatus according to claim 1, wherein said means for removing the identified dominant spectral components employs periodically-reconfigured constrained notch filters, the system function for which is $$H(z) = \prod_{j=1}^{J} \frac{1 - K\_est_j z^{-1} + z^{-2}}{1 - \beta K\_est_j z^{-1} + \beta^2 z^{-2}}$$

where $K\_est_j$ is a frequency-determining filter coefficient J is the number of tones that are expected to be on the data stream being filtered, $\beta$ is the distance of the poles from the origin in the z-domain and wherein periodic reconfiguration entails zeroing of output histories and the setting of $K\_est_j$ for said filters prior to each application of the filter to a block of data.

7. Apparatus according to claim 1, wherein said means for estimating the magnitude of data within a block of data, either before or after removal of the dominant spectral components, employs the average of a function of data samples within said block.

8. Apparatus according to claim 7, wherein said function employs a squaring operation.

9. Apparatus according to claim 1, wherein said means for deriving a running estimate of the duration of an N-tone employs the formula:

$$\text{dur} = BS\,(A_{c+1}/A_c + C + A_0/A_1)$$

when the same N-tone has been detected in each of the preceding C block classifications but the most recently derived block classification was not an N-tone, and $$\text{dur} = BS\,(A_{c+1}/A_c + C + 1)$$

when the same N-tone has been detected in each of the preceding C block classifications and the most recently derived block classification was also the same N-tone, and dur=0 when neither of the above conditions apply, where $A_i$ is a component magnitude estimate from i blocks preceding the most recently acquired set of blocks and BS is the duration of the block.

10. Apparatus according to claim 9, wherein a change from one N-tone class to another causes said running estimate of the duration of the N-tone to reset.

11. Apparatus according to claim 1, wherein said means for deriving a running estimate of the duration of time that the signal on said source line is not an N-tone is a compilation of the time not counted as an N-tone for said running estimate of the duration of an N-tone.

12. Apparatus according to claim 11, wherein interruption of a series of non-N-tone containing (non-DTMF) blocks by an N-tone containing (DTMF) block initiates resetting of said running estimate of the duration of time that the signal on said source line is not an N-tone.

13. Apparatus for detecting and classifying signals on a source line that are the additive combination of a few constant-amplitude sinusoidal components, herein called N-tones, comprising:

(a) a component isolation filter having an input coupled to said source line and operative to reject extraneous signal components and to separate data on said source line into one or more separate output streams;

(b) a block segmenter coupled to each of said output streams for producing blocks of successive data samples;

(c) a component magnitude estimator coupled to the output of each said block segmenter and operative for estimating the magnitude of data within each said block from each said output stream;

(d) a frequency estimator coupled to the output of each said block segmenter and operative for identifying the dominant spectral components within each said block from each said output stream, the number of dominant spectral components identified for each said block from each said output stream being known by design from the nature of the N-tones being detected and the distribution of signal components among said output streams;

(e) a periodically-reconfigured notch filter coupled to the output of each said block segmenter and coupled to the output of the corresponding frequency estimator and operative for removing the identified dominant spectral components from each said block from each said output stream without regard to previous blocks;

(f) a residual magnitude estimator coupled to the output of said notch filter and operative for estimating the magnitude of data within each said block from each said output stream after the identified dominant spectral components have been removed;

(g) a block classifier coupled to outputs of all component magnitude estimators, all frequency estimators and all residual magnitude estimators, and operative to test if the signal on said source line has the requisite properties of tonal purity, absolute component magnitude, relative component magnitude and component frequency, the output of said block classifier providing an indication of the class of N-tone that is present during times when said requisite properties are satisfied, the output of said block classifier also providing an indication of classification failure during times when said requisite properties are not satisfied;

(h) a timing classifier coupled to the output of said block classifier operative for testing the duration of a candidate N-tone for conformance with application-specific requirements regarding signal persistence and longevity, and other signal timing restrictions as required by the application; and (i) means for coupling a subset of the output of said component magnitude estimators to said timing classifier so that refined estimates of signal duration may be computed by said timing classifier.

14. Apparatus according to claim 13, wherein said component isolation filter includes a means of sample frequency conversion.

15. Apparatus according to claim 13, wherein said frequency estimators employ linear prediction analysis to produce as output the set of frequency-determining filter coefficients defined by $K\_est_j = 2\cos(2\pi f\_est_j T)$ where $K\_est_j$ is the estimated frequency-determining filter coefficient for component j, $f\_est_j$ is the frequency identified by $K\_est_j$ and T is the sampling period.

16. Apparatus according to claim 13, wherein the identified dominant spectral components are bounded to be near prespecified nominal values thereby impeding the subsequent removal of the dominant spectral components unless the dominant spectral components are each near one of the prespecified nominal values.

17. Apparatus according to claim 13, wherein said notch filters are periodically-reconfigured constrained notch filters, the system function for which is $$H(z) = \prod_{j=1}^{J} \frac{1 - K\_est_j\, z^{-1} + z^{-2}}{1 - \beta K\_est_j\, z^{-1} + \beta^2 z^{-2}}$$

where $K\_est_j$ is a frequency-determining filter coefficient, J is the number of tones that are expected to be on the data stream being filtered, $\beta$ is the distance of the poles from the origin in the z-domain and said periodic reconfiguration entails zeroing of output histories of said filters and the setting of $K\_est_j$ prior to each application of the filter to a block of data, the values of $K\_est_j$ for said periodic reconfiguration being provided by the output of said frequency estimator after being applied to the same block of data.

18. Apparatus according to claim 13, wherein said component magnitude estimators and said residual magnitude estimators each estimate the magnitude of data within each said block of data using the average of a function of data samples within said block.

19. Apparatus according to claim 18, wherein said function is a squaring operation.

20. Apparatus according to claim 13, wherein said timing classifier employs the following formula to derive a running estimate of the duration of an N-tone:

$$\text{dur} = \text{BS} (A_{c+1}/A_c + C + A_0/A_1)$$

when the same N-tone has been detected in each of the preceding C block classifications but the most recently derived block classification was not an N-tone, and $$\text{dur} = \text{BS} (A_{c+1}/A_c + C + 1)$$

when the same N-tone has been detected in each of the preceding C block classifications and the most recently derived block classification was also the same N-tone, and dur=0 when neither of the above conditions apply, where $A_i$ is a component magnitude estimate from i blocks preceding the most recently acquired set of blocks and BS is the duration of the block.

21. Apparatus according to claim 13, wherein said timing classifier includes means for deriving a running estimate of the duration of time that the signal on said source line is an N-tone and wherein a change from one N-tone class to another causes said running estimate of the duration of the N-tone to reset.

22. Apparatus according to claim 21, wherein said timing classifier includes means for deriving a running estimate of the duration of time that the signal on said source line is not an N-tone, said non-N-tone running estimate deriving means being a compilation of the time not counted as an N-tone for said running estimate of the duration of an N-tone.

23. Apparatus according to claim 22, wherein interruption of a series of non-N-tone containing (non-DTMF) blocks by an N-tone containing (DTMF) block initiates resetting of said running estimate of the duration of time that the signal on said source line is not an N-tone.

24. A method for detecting and classifying signals on a source line that are the additive combination of a few constant-amplitude sinusoidal components, herein called N-tones, comprising:
   (a) rejecting of extraneous signal components from the said source line signals, and producing one or more separate output streams:
   (b) establishing blocks of successive data samples from each said output stream;
   (c) estimating the magnitude of data within each said block from each said output stream;
   (d) identifying the dominant spectral components within each said block from each said output stream;
   (e) removing the identified dominant spectral components from each said block from each said output stream without regard to previous blocks;
   (f) estimating the magnitude of data within each said block from each said output stream after removal of the identified dominant spectral components;
   (g) testing the magnitude estimates that were obtained both before and after removal of the identified dominant spectral components, thereby partially ascertaining if the signal on said source line has the requisite properties of an N-tone;
   (h) testing the frequencies of the identified dominant spectral components, thereby partially ascertaining if the signal on said source line has the requisite properties of an N-tone;
   (i) deriving a running estimate of the duration of time that the signal on said source line is an N-tone;
   (j) deriving a running estimate of the duration of time that the signal on said source line is not an N-tone;
   (k) testing the durations of candidate N-tones and intervening non-N-tone segments for conformance with signal persistence and longevity requirements.

25. A method according to claim 24, wherein said rejecting step of extraneous signal components utilizes a combination of digital filters, downsamplers and sample-rate converters.

26. A method according to claim 24, wherein said said step of identifying of dominant spectral components includes employing linear prediction analysis to produce as output the set of frequency-determining filter coefficients defined by the formula $$K\_est_j = 2\cos(2\pi f\_est_j T)$$

where $K\_est_j$ is the estimated frequency-determining filter coefficient for component j, $f\_est_j$ is the frequency identified by $K\_est_j$ and T is the sampling period.

27. A method according to claim 24, wherein said identifying step includes a bounding process which forces said values of $K\_est_j$ to be near prespecified nominal values, said bounding process preventing said notch filters form removing the dominant spectral components unless said dominant spectral components are each near one of the prespecified nominal values, thereby making the magnitude of the output of said notch filters dependent on both the strength of said dominant spectral components relative to other spectral components and the closeness of the frequency of said dominant spectral components to one of said prespecified nominal values.

28. A method according to claim 24, wherein said removal of the identified dominant spectral components includes periodically-reconfigured constrained notch filtering, the system function for which is $$H(z) = \prod_{j=1}^{J} \frac{1 - K\_est_j z^{-1} + z^{-2}}{1 - \beta K\_est_j z^{-1} + \beta^2 z^{-2}}$$

where $K\_est_j$ is a frequency-determining filter coefficient, J is the number of tones that are expected to be on the data stream being filtered, $\beta$ is the distance of the poles from the origin in the z-domain and said periodic reconfiguration entails zeroing of output histories of said filters and the setting of $K\_est_j$ prior to each application of the filter to a block of data, the values of $K\_est_j$ for said periodic reconfiguration being provided by the output of said frequency estimator after being applied to the same block of data.

29. A method according to claim 24, wherein said estimating of the magnitude of data within a block of data, either before or after removal of the dominant spectral components, includes the averaging of a function of data samples within said block.

30. A method according to claim 29, wherein said function includes a squaring operation.

31. A method according to claim 24, wherein said derivation of a running estimate of the duration of an N-tone includes the formula:

$$dur = BS (A_{c+1}/A_C + C + A_O/A_1)$$

when the same N-tone has been detected in each of the preceding C block classifications but the most recently derived block classification was not the same N-tone, and $$dur = BS (A_{c+1}/A_c + C + 1)$$

when the same N-tone has been detected in each of the preceding C block classifications and the most recently derived block classification was also the same N-tone, and dur=0 when neither of the above conditions apply, where $A_i$ is a component magnitude estimate from i blocks preceding the most recently acquired set of blocks and BS is the duration of a block.

32. A method according to claim 24, including resetting said running estimate of the duration of the N-tone in response to a change from one N-tone class to another.

33. A method according to claim 24, wherein said step of deriving a running estimate of the duration of time that the signal on said source line is not an N-tone is obtained by compiling the time not counted as an N-tone for said running estimate of the duration of an N-tone.

34. A method according to claim 24, wherein interruption of a series of non-N-tone containing (non-DTMF) blocks by an N-tone containing (DTMF) block initiates resetting of said running estimate of the duration of time that the signal on said source line is not an N-tone.

* * * * *